S. ADAMS.
BUTTON.

No. 182,263.  Patented Sept. 19, 1876.

UNITED STATES PATENT OFFICE.

SAMUEL ADAMS, OF ANTIOCH, CALIFORNIA.

IMPROVEMENT IN BUTTONS.

Specification forming part of Letters Patent No. 182,263, dated September 19, 1876; application filed May 22, 1876.

*To all whom it may concern:*

Be it known that I, SAMUEL ADAMS, of Antioch, State of California, have invented an Improved Fastening Stud or Button for Textile or Flexible Fabrics, of which the following is a specification:

My invention relates to an improvement in studs or fastenings for uniting together the seams of garments. It consists of a flat-headed stud or button, with a groove on its under side, and two points or beveled teeth projecting from it at the center, two of these studs being used, one above and one below the fabric, and the teeth of each thus coming in line with each other, they act to clinch within the fabric, and hold the two parts of the seam together, as will hereinafter fully appear.

Figure 1:
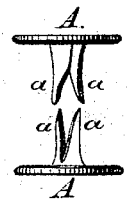
Figure 2:
Figure 3:

Figure 1 of the drawing is a side elevation of the two parts of the fastening before they are united together within the fabric; Fig. 2, a view of the parts as they appear when clinched within the fabric; Fig. 3, a plan view of the under side of the stud or fastening.

My invention is used for fastening together the seams in textile fabrics, leather, and other flexible material at points where great strain or wear is received.

The head A is flat on its upper face, but is made with a rim or a surface of concave shape thicker at the edge. It has also two points or teeth, *a a*, projecting from its under side that are made with beveled edges running from the bottom of the tooth to the point, so that the teeth of one fastening, when two of them are in line with each other, will come into the spaces between the teeth of the other fastening. One part of the fastening is thus a duplicate of the other. These fastenings are inserted through a puncture or hole made in the fabric, one above and one below the material, with the points of one filling the spaces between the points of the other. A blow or pressure applied to the face of the stud drives the two parts together, and forces the points of the teeth outward, clinching them together within the fabric. Thus the two parts are held together by the fabric being caught between the under faces of both fastenings and the teeth that are spread out radially in the operation of clinching.

The faces of the fastenings may be made of any form, though I have shown them as circular and with flat heads, and the teeth or points may be of greater number than herein described and shown.

As thus constructed, my invention serves to hold and secure together the parts of fabrics at the seams, and wherever greater strength is required, in a neat and effective manner, without allowing the parts of the garments or material around the fastening to stretch and loosen under strain.

Having thus fully described my invention, what I claim, and desire to secure by Letters Patent, is—

The fastening described, consisting of the two heads, A A, each having a groove in its under side, and the teeth or points *a a*, constructed, arranged, and combined substantially as described and shown.

Witness my hand and seal this 6th day of May, A. D. 1876.

SAML. ADAMS. [L. S.]

Witnesses:
C. W. M. SMITH,
PHILIP MAHLER.